3,642,966
DIPPING PROCESS FOR FORMING NONLEATHER, POROMERIC FOOTWEAR
Richard T. Morrissey, Cuyahoga Falls, and Nelson C. Hess, Akron, Ohio, assignors to The B. F. Goodrich Company, New York, N.Y.
Filed Nov. 24, 1969, Ser. No. 879,580
Int. Cl. B29c 13/04; B29d 27/04
U.S. Cl. 264—45
3 Claims

ABSTRACT OF THE DISCLOSURE

One piece poromeric footwear is produced by a dipping process on footwear forms. The forms are covered with a textile jacket that has been wet with water and they may be equipped for fluid to flow therethrough from interior to exterior. The dip cement is specially formulated for viscosity and nonsolvent liquid content.

BACKGROUND OF THE INVENTION

Leather shoes and boots made by sewing or cementing together pieces of tanned hides cut to a pattern are old in the art. One piece shoes molded by slush molding or injection molding from vinyl resins and plastisols are also known in the art. These one piece footwear articles of the art are not poromeric; they do not breathe as leather foot wear does. One piece articles such as rubber gloves have been made in the art by the process of dipping forms into latexes or polymer solutions. Such gloves are not poromeric in nature.

Poromeric materials breathe or pass water vapor and air, but are impermeable to the passage of liquid water. This property is due to the unique cellular structure of the poromeric materials.

Poromeric films and coatings have been produced by spreading a solution of a synthetic polymer, generally a polyurethane or a mixture of polyurethane and a minor amount of another synthetic polymer such as polyvinyl chloride, on a substrate and then immersing the coated substrate in a bath of a fluid which is compatible with the polymer solvent, but is not itself a solvent for the polymer or polymers employed. The immersion in the nonsolvent for the polymer apparently coagulates the polymer or mixture of polymers into a cellular configuration on the substrate and extracts the polymer solvent. When dried, the cellular film deposited on the substrate is poromeric in nature and generally leather-like in properties. If the film is applied to a porous textile substrate, the laminate is useful in the manufacture of leatherlike shoes, upholstery, and luggage.

One difficulty in manufacturing shoe uppers, for instance, from poromeric laminates made as described above, is their tendency to a lack of surface uniformity. When the material is placed under tension, as by pulling down over a shoemaker's last, the patterns of the textile substrate tend to show through the stressed poromeric film coating thereon. This orange peel or roughness effect is undesirable in a shoe or boot which is intended to have a plain, smooth surface. When the film is embossed with a grain or design, the effect of substrate patterns showing through the surface is often masked and concealed, but smooth emboss does not have this effect and the current shoe styles call for smooth embossed leathers and poromeric materials in a high percentage of shoes made.

Attempts have been made to eliminate or reduce the orange peel effect by careful selection of an interlayer of particular woven cotton fabric or special nonwoven webs of randomly disposed fibers. Another approach is to draw a viscous polymeric layer down through the interlayer and into the substrate layer before applying the polyurethane top film, but the problem is not fully solved. Methods of impregnating and coating substrate involve pulling materials through the process steps. Tensions on the fabrics and films at various times set up stresses in the finished material which result in orange peel and poor vamp break properties in shoes.

The ages-old method of making slippers, shoes and boots from leather by pulling pieces over a wooden last and nailing them thereto, then sewing, cementing, gluing or nailing them together is still widely employed. Much expensive hand labor is required. Automated lasting machines, tackers, stitchers and cementers are also used, but the amount of skilled hand operation needed in the industry is still very substantial. In addition to the high labor costs involved, the method of manufacture creates stresses in the poromeric materials and these stresses contribute to the undesirable surface appearance described above.

Dipping methods are known in the art whereby internally stress free, but impermeable, rubber footwear has been made from latexes. These include (1) simple dipping of a form followed by drying and vulcanizing the deposit; (2) use of a porous form such as unglazed porcelain and formation of a deposit by filtration, with or without the aid of suction; (3) use of either an impervious or porous form coated with a coagulant or dehydrating solution; (4) simple dipping as in (1) followed by application of an external coagulant to the deposit; (5) use of a heated form in conjunction with heat-sensitized latex; (6) combinations of the above methods.

One present method for making rubber boots involves pasting cut pieces of liner on an aluminum form which is dipped in a natural rubber or SBR latex, then in a coagulating salt solution, followed by a second latex dip and second coagulation. The boot is oven cured, sole and heel are applied, and the article is stripped from the form. These boots are impermeable and hot to wear. A knee high boot will weigh about one and one-half pounds. Boots made by the new process described below weigh about one-half pound.

Non-poromeric vinyl boots are made by a dipping process. Wood or porcelain forms dipped into an organosol, plastisol, or thickened vinyl latex, polyvinyl chloride, for example; pick up a film of polymer which dries and can be stripped off the boot form. Such boots are soft, embossable, can be colored to virtually any color and pattern, but are impermeable, hence hot and uncomfortable to wear. Many individuals cannot wear a vinyl boot at all, others can wear them for only short periods of time.

In general, solvent-type dipping processes control the viscosity of the batch and thickness of the film deposited on the form by means of selectively mixing solvents to control the evaporation rate.

One process for preparing poromeric laminate structures is described in U.S. Pat. 3,460,969. An essentially linear polyesterurethane, prepared according to the teaching of U.S. Pat. 2,871,218, having essentially no free hydroxyl or isocyanate groups, is dissolved in a hot hygroscopic solvent such as dimethylformamide, thioxtropically thickened with a finely divided pyrogenic silica viscosity improver, and combined with sufficient water to create a colloidal dispersion at 45°–60° C. The exact temperature at which the colloidal dispersion is first formed when a given amount of water is added to the polyurethane-solvent mixture is referred to herein as the cloud point. The cloud point mixture is then heated to further raise its temperature about 5° C. upon which it reverts to the state of a true solution of polymer in solvent combined with a dispersion of the silica viscosity improver. This material is coated onto the desired substrate at its elevated temperature and allowed to air set for about 5 minutes. In this air set period the polymer assumes a cellular configuration which is found to be microporous and permeable as part of the solvent separates out and evaporates. The remaining solvent is then removed by water extraction in appropriate extraction baths and the structure is dried.

When a poromeric film of this type is laid on a nonwoven textile substrate, it is often found that with or without an interlayer such as woven cotton sheeting placed between the substrate and the polyurethane film, the laminate, when used to form shoe uppers, shows the characteristics of orange peel or roughness when it is placed under tension and pulled down over a shoe making last. Orange peel is a surface effect wherein the pattern of substrate fibers strikes through and appears as undesirable effect on the surface of the polyurethane polymer. Also, it is impossible to use this material to make one piece boots as is done in the art of handling non-poromeric materials. Boots can be made, but they have to be seamed because the pieces have been cut to required patterns. Zippers, laces, buttons or sewn thread must be provided to close these seams. It would be advantageous to be able to form poromeric boots and shoes by a dipping process. There are no tension stresses created in such a material.

When boot forms are dipped into the material described above for the preparation of poromeric laminates in an attempt to produce a poromeric boot by dipping, it is found that the polyurethane solution-silica dispersion cement does not adhere to the form. If the form is first covered with a fabric "sock," the polymer will adhere to the sock on the form, but not uniformly. The high viscosities, 30,000–40,000 c.p.s., and the requirement of operating at 50°–65° C. as called for in the prior art may account for this. Also, the polymer solution employed in a dipping process needs a longer useful life than a solution which is made up and quickly spread at high rates on a substrate. When the elevated operating temperatures of the prior art are used in performance of a dipping operation, the dip cement tends to lose water and solvent and to become more viscous, and hence impossible to adhere to a form dipped therein.

SUMMARY OF THE INVENTION

A method of forming slippers, shoes, and boots by a dipping process has been discovered which offers economy in manufacture, freedom from processing tensions and resultant orange peel even in cases of smooth emboss. Also, for the first time, one piece, seamless, knee high boots can be made from poromeric materials. No zippers, buttons or other fasteners are needed as are required in present day methods to close seams where pattern-cut pieces meet. Footwear made by this process is free of internal stresses.

Mean have been discovered to modify the polyurethane, water, silica, dimethylformamide mixture of the prior art, and the process steps to which it is submitted, in order to form poromeric boots successfully by a dipping process. High and low cut shoes can also be formed by this new process. The process is amenable to pigmenting, coloring or dyeing, embossing, and finishing steps as practiced in the leather and plastic arts. Soles and heels are added to the boots by known adhesive means.

The drawing shows a flow diagram indicating the essential steps in the process of the invention.

A prior art process for forming a poromeric layer by spreading polyurethane cement on a textile substrate is disclosed in U.S. Pat. 3,460,969. A coating composition is formed comprising (1) a linear urethane polymer, (2) a solvent for said polymer selected from the group consisting of dimethylsulfoxide, dimethyl formamide and dimethylacetamide, (3) an inert liquid which is a non-solvent for the polymer, but is miscible with the solvent, the inert liquid being present in an amount sufficient to create a cloud point dispersion at the temperature of mixing the polymer, solvent and inert liquid, and (4) a thixotropic thickening agent which is dispersed in the system but is not dissolved therein. The mixture is employed by heating it to a temperature high enough to cause it to revert to a true solution, generally in the range 37° C. to 90° C., and coating it on the textile substrate at said elevated temperature. After an airset time of ½ to five minutes the structure is immersed in a water bath for extraction of solvent and is then dried.

The process employs 15%–25% by weight solutions of linear polyurethane in dimethylformamide plus an amount of inert liquid (1) equal to 5% to 70% by weight of said polyurethane and (2) 2% to 15% by weight of the polyurethane of a thixotropic thickening agent. The components are mixed as described in Example IV of U.S. Pat. 3,460,969. The polyesterurethane is first dissolved in about 80% of the total parts of dimethylformamide. Pyrogenic silica thickening agent is dispersed in the water and the balance of the dimethylformamide in an Eppenbach homogenizer and added to the polyesterurethane solution at 60° C. Octodecyl-trimethyl ammonium chloride and glycerol are added with stirring at 60° C. The cement has a cloud point of 50° C. and a Brookfield viscosity of about 40,000 c.p.s.

In the method of this invention, to form a cement for a dipping process, instead of for a spreading process, the same ingredients in essentially the same amounts, are carefully mixed in a different order and this produces a cement with distinctly different cloud point and lower viscosity. A major part, about 75%–85%, preferably 80%, of the thickening agent is mixed with about 10%–20%, preferably 15%, of the solvent and about 2% of the water. This dispersion of thickening agent is then mixed with about 70%–80%, preferably 75%, of the total solvent and only then is the polyurethane dissolved into this batch by stirring. The temperature rises to about 60° C. as the polymer dissolves and is allowed to return to room temperature, at which time the last 10% of the solvent, the remaining approximately 10% of the thickening agent and the final 98% of the water are premixed and added. When thoroughly mixed, this cement surprisingly has a cloud point below room temperature and a viscosity of about 10,000 cps. at 23° C. Dyes, plasticizers and other pigments can be added to the batch.

The newly developed method controls the thickness of film deposited on a textile covered form by controlling the viscosity of the dipping cement, allows for the use of only one solvent, and thereby simplifies solvent recovery. Viscosity of the dipping cement is controlled by the addition of a major portion of the thickening agent to a major portion of the solvent before the polymer is dissolved therein. The major portion of the determined amount of water is added after the solution of polymer is complete. The amount of water addition to the cement is critical because it (1) partially regulates dipping viscosity, and (2) apparently accelerates the extraction of solvent from the deposited film to give a satisfactory poromeric structure. A minimum amount of water, determined as 20 parts per 100 parts of polyurethane, is required in order to give a cement with a viscosity sufficiently high for successful forming of footwear by dipping. An insufficient amount of water causes (1) a low viscosity cement which is too easily absorbed by the fabric cover on the form and results in a thin film with coarse porosity, and (2) collapse of the film particularly in the regions of the sole. Too great amounts of water (above 50 parts per 100 parts of polymer), on the other hand, also give lowered viscosity cement and conditions similar to those described for too little water.

Particularly for the dipping of boots it is advantageous to adopt collapsible forms which are known in the art. At the completion of the process, the form is disassembled inside the boot and the sections are readily removed.

The dipping forms employed are preferably metal and preferably aluminum to best stand the bath and processing conditions.

An optional feature of the forms used in this invention is that when the deposit has been sufficiently built up, extraction water may be applied and circulated from the interior of the form, through the walls of the form and through the liner and the deposited film from inside to outside, extracting and removing solvent as it flows and achieving excellent extraction of the solvent.

The process is extremely versatile and can be set up as a continuous operation from the dipping of the form to the removal of a completely finished shoe or boot. The form is first covered with a woven fabric cover shaped to fit said form which, when wet with water, prevents the cement from adhering to the form and also serves as a liner for the article of footwear. This textile cover is essentially a sock for the footwear form. The sock is preferably made from a water wettable and water absorbent textile such as a woven cotton. Various water resistant fibers such as rayon, nylon and polypropylene can be blended with cotton to form the woven fabric. The proportion of synthetic fiber to cotton fiber is preferably 40 parts or less per 100 parts total fiber. Such proportions guarantee that the form cover or sock can be wet with water before the dipping so as to pick up approximately 100% of the total fiber weight of water. This water apparently serves as a barrier to keep the poromeric cement from striking through the thickness of the woven fabric sock, generally 1 to 2 mils, and adhering to the form and also aids in extraction of solvent from the first layers of polymer deposited, thereby coagulating the polymer and starting the formation of microporous cellular structure. The sock covered form is coated in a dipping tank, subjected to solvent extraction, dyed, has sole and heel applied, is embossed, and is finally finish coated in one continuous operation. The woven sock can serve as the boot or shoe lining, or, if desired, an inner lining of sponge or foam elastomer or a softer textile weave than the woven sock may be applied to the interior of the article after it is removed from the form. Textile flock can be applied to the boot or shoe exterior after the extraction and before the article is dried. This gives a suede-like appearance.

The invention involves preparing a dipping cement of an essentially linear polyesterurethane of the type described in U.S. Pat. 2,871,218. The polymer is dissolved in a hygroscopic solvent, typically dimethylformamide, although dimethylacetamide, dimethylsulfoxide, tetramethyl urea and tetrahydrofuran are also useful. Water and viscosity improvers are added to control batch viscosity. Pyrogenic silicas, carboxy vinyl polymers, sodium carboxy methyl cellulose and polyacrylate salts are useful viscosity improvers. The pyrogenic silicas have particle size about 0.015 micron, surface area 200 m.$^2$/g. and bulk density about 2.2 lb. per cubic foot. When pyrogenic silicas are used, their thickening effect is enhance by the addition of small amounts of a polar liquid and cationic or non-ionic additives. Typical additives are glycerol and octadecyl-trimethyl ammonium chloride. As in the prior art teaching, these are used at the rate of 2.0 parts glycerol and 2.5 parts substituted ammonium chloride per 12.5 parts pyrogenic silica. On the basis of 100 parts of polyurethane, 25 to 50 parts by weight of water are employed with 6 to 15 parts of thickening agent. These critical ranges of viscosity improver and water are narrower than the ranges of these materials employed in the prior art to prepare spreading cements.

The dipping cement is prepared on the basis of 20% to 30% total solids of polymer, preferably about 20%, that is, 100 parts of polymer are used with 400 parts of solvent. Dipping cements prepared with the materials cited in the given ranges are found to have Brookfield viscosities (number 5 spindle, 2.5 r.p.m.) of about 9000 to about 15,000 cps. at 23° C. As the dipped form is withdrawn from the cement it is slowly rotated over itself in a manner known in the art so that the draining cement forms the sole area smoothly and evenly. The dipped form is held in air for an air set time of one-half to 5 minutes depending upon the amount of water employed initially. If the air set time is too short, the film tends to collapse and will not be permeable. After the air set period, the coated form is immersed in a water bath at 50° to 60° F. for 10–30 minutes to set the film structure formed during the air set and start the extraction of solvent. Next the form is immersed in a bath of 120° to 140° F. water for 30–60 minutes to accomplish final extraction. The thickness of the film and the amount of water used in the initial cement largely determine the porosity and moisture vapor permeability (MVT) of the final film. Colder water is used in the first bath to fully set the film structure. The hotter second bath is used for greater efficiency in solvent extraction.

The seamless article of footwear produced can be embossed either by retaining it on the form and placing it in an embossing mold or by removing it from the form, and inserting an inflatable bladder which presses the article against an embossing roll, plate or other surface. Pigmented finishes and sprays such as are employed in leather and thermoplastic finishing arts can be applied.

DETAILED DESCRIPTION OF THE INVENTION

Preparation of poromeric dipping polymer

A linear polyesterurethane polymer is prepared by following the teaching of U.S. Pat. 2,871,218. First 100 g. (1.0 mol) of hydroxyl terminated poly(tetramethylene adipate), molecular weight 1000, hydroxyl number 112, acid number 2.5, and 180 g. (2.0 mols) of butanediol-1,4 are mixed in a heated autoclave with stirring for 15 minutes at 10 mm. pressure and 100°–105° C. Next 750 g. (3.0 mols) of diphenylmethane-p,p'-diisocyanate are added and stirred for 2 minutes. The melt is poured into lubricated metal trays and held in an oven for 3 hours at 140° C.

EXAMPLE I

A poromeric film forming composition is prepared which is the same as that shown in Example IV of U.S. Pat. 3,460,969. Polyurethane made as above, is mixed in the recipe:

| Ingredient: | Parts by weight |
|---|---|
| Polyesterurethane | 100 |
| Dimethylformamide | 400 |
| Pyrogenic silica | 12.5 |
| Glycerol | 2.0 |
| Octadecyl-trimethyl ammonium chloride | 2.5 |
| Water | 50.0 |
| | 567.0 |

The polyesterurethane is first dissolved in 337.5 parts of dimethylformamide. The silica is dispersed in the water and the balance of the dimethylformamide in an Eppenbach homogenizer and added to the polyurethane solution at 60° C. The octadecyltrimethyl ammonium chloride and glycerol are stirred in at 60° C. The cloud point of this mixture is 50° C. At 65° C. the mix is a true solution of polymer and the silica is dispersed therein.

An aluminum boot form is covered with a woven cotton sock. The sock is wet with 100% of its own weight of water. The form is dipped into the cement at 65° C. and withdrawn so as to retain a coating of the cement. The form is rotated to evenly form the coating on the sole portion, thereby undergoing an air set time of 2 minutes during which polymer and solvent separate and the polymer assumes a structure with many fine cells. After the air set period the coated form is immersed 15' in a water bath at 55° F. and 45' in a water bath at 130° F., then it is dried one hour in an air oven at 155° F.

The poromeric coating has a satisfactory MVT, but it is not evenly adhered to the woven sock; it is irregular in thickness, has poor flex properties and is very stiff.

When attempts are made to repeat the procedure, one hour after the first dipping, the cement viscosity is found to have increased drastically due to evaporative loss of solvent and water and it is now too thick to adhere well enough to the wet sock covered form to form a complete boot.

EXAMPLE II

A dipping cement is prepared to the following recipe:

| Material: | Parts by weight |
|---|---|
| Polyesterurethane (prepared as above) | 100 |
| Dimethylformamide | 400 |
| Pyrogenic silica | 12.5 |
| Glycerol | 2.0 |
| Octadecyl-trimethyl-ammonium chloride | 2.5 |
| Water | 50.0 |

The mixing procedure for the ingredients differs from that used in Example I in that polymer is not dissolved in solvent until viscosity improver is first dispersed in the solvent. Intially 10 parts silica, 55 parts dimethylformamide, and 1 part water are mixed together. This batch is combined with 300 parts dimethylformamide and 4 parts water and into this mixture is stirred and dissolved the 100 parts polyurethane. When the polymer is dissolved, the glycerol and octadecyltrimethyl ammonium chloride are added, followed by a mixture of 2.5 parts silica, 45 parts dimethylformamide and 45 parts water.

The entire mixing process is conducted at room temperature, 23° C. and the composition, while containing 8.8% water, the same as the mixture of Example I, is clear. The cloud point is unexpectedly found to be below 23° C. despite the large amount of water used.

Brookfield viscosity (No. 5 spindle, 2.5 r.p.m.) is 9000 cps. at 23° C. This viscosity is maintained for four days with the cement in an open tank at 73° F.

A collapsible, hollow, perforated, aluminum foot form is covered with a woven cotton sock and dipped in water so that the sock picks up water to the extent that it is wet with about 100% of its own weight. The wet, sock covered form is passed into the dipping cement and then is withdrawn at the rate of one inch in 8 seconds. The form is rotated slowly in conventional art practice as the excess mixture drains so that the sole area forms evenly and smoothly. The form is held in air for 30 seconds after leaving the dipping tank. The coated form is placed in a water bath for 15 minutes at 55° F. to start solvent extraction. Next the form is moved to a 130° F. water bath for 45 minutes to remove further solvent. While the form is in a water bath, water at the same temperature as the bath is circulated to the interior of the form, through the perforations therein, through the covering sock and through the deposited polymer film to the bath proper to further insure extraction of solvent. After the water extraction of solvent the form moves to an air oven for 1 hour at 155° F. At this time warm air is circulated from the interior of the form to the exterior of the boot.

The dried boot, still on the form is sprayed with a pigmented polyethylacrylate latex spray, dried, and then embossed by placing it in an embossing mold with a bladder type seal. Air is forced into the form and presses the boot out toward the heated (275° F.) inner surface of the embossing mold. The embossed surface is sprayed with a nitro cellulose finish for gloss. A sole and heel portion are affixed to the boot with conventional adhesives.

The boot, a size 7, is worn by a woman who wears a size 7 boot. It is observed to be extremely comfortable after 7 hours of continuous wear. The boot is then submitted to various tests with the following results:

| Test: | Results |
|---|---|
| Moisture vapor transmission. | 275 g./m.$^2$/24 hrs. (acceptable —200+). |
| Bally flex test | 300,000+ (50,000 flexures to cracking acceptable). |
| Taber abrasion loss (2000 revolutions, ASTM No. 4311, abrading wheel No. 822). | 1.0 g. (1.2 g. acceptable). |

EXAMPLE III (too little water)

A dip mixture is made to the same recipe as used in Example II, except that water is cut to 20.0 parts. The same form, type of fabric form cover, water pick-up on the cover and dipping, extracting, drying, embossing and spraying are employed and followed with these results:

| Test: | Results |
|---|---|
| MVT | 100 g./m.$^2$/24 hrs. |
| Bally flex | 300,000+ (flexure to crack) |

The flex strength is satisfactory, but the MVT is far too low for a comfortable boot. In addition the boot is very rough in the toe area and fabric lines show through the film indicating collapse of the polyurethane film. The boot is much more stiff than the product of Example I.

We claim:

1. A dipping process for the formation of a poromeric footwear article comprising dipping a water wet fabric coated form into a solvent cement to form a coating thereon, said cement comprising an essentially linear polyesterurethane, a solvent for said polyesterurethane selected from the class consisting of dimethylformamide, dimethylsulfoxide and dimethylacetamide, an inert liquid which is a non-solvent for said polyesterurethane, but is miscible with the said solvent, and a thixotropic thickening agent, said cement being formulated for dipping viscosity and for air set coagulation of said coating into a microporous cellular configuration upon withdrawal of said form from said cement, washing said articles in a first water bath to set the said cellular configuration, washing said article in a second water bath to remove the balance of the said solvent, drying said article and removing said article from said form.

2. A dipping process for the formation of an article of poromeric footwear comprising covering a dipping form with a textile cover shaped to fit said form, wetting said textile cover with water, dipping said covered form into a poromeric forming dip cement to form a coating thereon said cement comprising an essentially linear polyesterurethane, a solvent for said polyesterurethane selected from the class consisting of dimethylformamide, dimethylsulfoxide, and dimethylacetamide, an inert liquid which is a non-solvent for said polyesterurethane, but is miscible with the said solvent, and a thixotropic thickening agent, said cement being formulated for dipping viscosity and for air set coagulation of said coating into a microporous cellular configuration upon withdrawal of said form from said cement, withdrawing said form from said dip cement with a cement coating thereon, holding said coated form in air for a period of 0.5 to 5 minutes, whereupon said coating transforms into a poromeric, polymeric film as it cools to cloud point temperature and polyesterurethane precipitates out of solution into a microporous cellular configuration, dipping said coated form in a first water bath at 50°–60° F. for 10–30 minutes to set said film structure, then in a second water bath at 120°–140° F. for 30–60 minutes to extract said solvent, and drying and removing said article from said form.

3. The dipping process of claim 2 wherein said dip cement comprises:

| Material (essentially linear): | Parts by weight |
|---|---|
| Polyesterurethane | 100 |
| Dimethylformamide | 233–400 |
| Pyrogenic silica | 6–15 |
| Glycerol | 2.5 |
| Octadecyl-trimethyl ammonium chloride | 2.5 |
| Water | 25–50 | and said dip cement is prepared by (1) mixing 75%–85% of the pyrogenic silica with 10%–20% of the dimethylformamide and 2% of the water to form a dispersion which is added to (2) 70%–80% of the dimethylformamide, followed by (3) the 100 parts polyesterurethane, and (4) lastly the balance of the pyrogenic silica, dimethylformamide and water and said cement is characterized by a cloud point below the temperature of mixing the ingredients and Brookfield viscosity of 9,000–15,000 cps. 23° C.

References Cited

UNITED STATES PATENTS

| | | | |
|---|---|---|---|
| 1,955,840 | 4/1934 | Trobridge | 264—306 X |
| 2,295,735 | 9/1942 | Hurt | 264—306 X |
| 3,190,765 | 6/1965 | Yuan | 260—2.5 AR |
| 3,190,766 | 6/1965 | Yuan | 260—2.5 AR |
| 3,460,969 | 8/1969 | Murphy | 117—63 |

PHILIP E. ANDERSON, Primary Examiner

U.S. Cl. X.R.

260—2.5 AR; 264—41, 234, 305